United States Patent Office 3,007,845
Patented Nov. 7, 1961

3,007,845
DITHIOPHOSPHATES AS SYSTEMIC INSECTICIDES IN MAMMALS
Redginal Irving Hewitt, Nanuet, N.Y., and Emanuel Waletzky, Westwood, N.J., assignors to American Cyanamid Company, New York, N.Y., a corporation of Maine
No Drawing. Filed May 5, 1958, Ser. No. 732,816
12 Claims. (Cl. 167—53)

This invention relates to the control of parasites such as worms, insects, and other arthropods, more particularly to those which feed on or in the bodies of warm-blooded animals.

A large number of different parasites live on or in the bodies of warm-blooded animals causing considerable economic losses. Presently known methods of controlling certain worms and arthropods are not entirely satisfactory. One such instance is the warble fly, Hypoderma, which attacks cattle at certain times of the year with the ultimate development of grubs under the skin of their backs. Up to the time of the present invention, very little could be done to control the development of these grubs in the body of the animal; and once infected, considerable damage to the meat and hide of the animal inevitably occurred. Milk production of infected cattle has been also adversely affected during certain stages of the development of this insect.

The life cycle of the warble fly involves the laying of eggs on the heels of cattle. When the larvae hatch, they bore into the skin, migrate into the body cavity and ultimately to the esophagus or spinal canal where they develop for some time. They then migrate to the back of the animal where they develop further over a period of time of about two months. Ultimately, the grubs bore through the skin of the animal and fall to the ground where they pupate and develop into a fly in another month. Attacks by these insects annoy the cattle, adversely affect their milk production and weight gains, spoil the meat in areas where the grub develops and produce defects in the hide which reduce its value for making leather. The life cycle of the warble fly in the host is from about nine to eleven months, during which time it has not been heretofore possible to do much to eliminate the infestation. The present invention provides means of destroying these insects during their several stages of growth while in the body of the host.

Other parasites which cause economic losses in warm-blooded animals are the human bot fly, *Dermatobia hominis*, which causes considerable trouble in cattle in Central and South American areas. Also *Oestrus ovis*, the sheep nose bot, and screw worms, which are maggots of the fly *Callitroga hominivorax*, are undesirable animal parasites. These, too, may be controlled by the process of the present invention.

Mosquitoes are, of course, well-known insect pests which feed on warm-blooded animals, annoying the animals, interfering with their feeding and general comfort, and being also vectors of infectious diseases. Mosquitoes which feed on warm-blooded animals treated in accordance with the teachings of the present invention may also be killed as a result.

Lice are also other well-known insects which naturally infect a large variety of warm-blooded animals to the detriment of these animals. They are also well-known vectors of disease. These and many other related insects which feed on warm-blooded animals are also killed by feeding upon warm-blooded animals treated in accordance with the teachings of the present invention.

In addition to the above animal parasites, various worms such as ascarids which infect such animals as swine, dogs, chickens, and other animals may be controlled by the practice of the present invention.

We have discovered that certain carbamoyl alkyl phosphates which have the general formula:

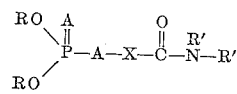

in which R is methyl, A is oxygen or sulfur, X is an alkylidene radical of from one to four carbon atoms such as —CH$_2$—, —CH$_2$CH$_2$—,

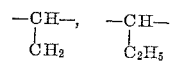

and the like, and R' is hydrogen or a lower alkyl radical (up to eight carbon atoms) are effective systemic insecticides for warm-blooded animals when administered orally or parenterally thereto in amounts ranging from about 0.5 milligram to 250 milligrams of the carbamoyl alkyl phosphate per kilogram of animal body weight, the amount depending upon the particular phosphate used, the animal under treatment and the type of treatment desired, as will be explained hereinafter in greater particularity.

Many of these carbamoyl alkyl phosphates and a method of preparing the same are disclosed in United States Patent No. 2,494,283, issued January 10, 1950. When X in the general formula above is a methylidene radical, chloroacetamide is used as an intermediate in the process. When X is to be other alkylidene radicals, an appropriate substitution of the chloroacetamide is made with an alpha- or beta-halo acid amide. To prepare O,O-dimethyl-S-1-(methylcarbamoyl) propyl phosphorodithioate, one would use, for instance, alpha-bromo-N-methyl butyramide in the Cassaday et al. process.

Although O,O-dimethyl-S-(N-methylcarbamoyl)-methyl phosphorodithioate is a particularly effective systemic insecticide and is one of the group falling under the general formula above for use in controlling insects which feed on warm-blooded animals, other compounds of this group which may be effectively used include O,O-dimethyl-S-(N-ethylcarbamoyl)-methyl phosphorodithioate, O,O-dimethyl-S-(N-propylcarbamoyl)- methyl phosphorodithioate, O,O-dimethyl-S-(N-isopropylcarbamoyl)-methyl phosphorodithioate, O,O-dimethyl-S-(N-methylcarbamoyl)-methyl phosphorothioate, O,O-dimethyl-S-(N-methylcarbamoyl)-ethyl phosphorothioate, O,O-dimethyl-O-(N-methylcarbamoyl)-methyl phosphorothioate, O,O-dimethyl-O-(N-methylcarbamoyl)-methyl phosphate, O,O-dimethyl-S-(N-methylcarbamoyl)-ethyl phosphorodithioate, O,O-dimethyl-S-1-(methylcarbamoyl)-ethyl phosphorodithioate, O,O-dimethyl-S-2-(ethylcarbamoyl)-ethyl phosphorodithioate, O,O - dimethyl - S - 1 - (methylcarbamoyl)-propyl phosphorodithioate, O,O-dimethyl-S-(N-dimethylcarbamoyl)-methyl phosphorodithioate, and still others.

Our discovery that the above-described carbamoyl alkyl phosphates and other closely related compounds can be administered to warm-blooded animals for the purpose of killing insects which feed on or in said animals is very surprising for a number of reasons. The carbamoyl alkyl phosphates of United States Patent No. 2,494,283 are as a class quite toxic to mammals. We have found that certain ones of these may be safely administered to animals in certain concentrations without ill effect; yet, these concentrations are such that they will kill insects which feed upon the animal. This type of systemic insecticidal activity in warm-blooded animals for these compounds has not been observed prior to our invention insofar as we are aware. It is also surprising in that some of the most effective contact insecticidal carbamoyl alkyl phosphates are ineffective or only partially effective when administered to warm-blooded animals. Many of the carbamoyl alkyl phosphates kill the animal before they kill the insect which feeds thereon, and of course, cannot be used as systemic insecticides for use with mammals.

As noted above, the effective amounts of carbamoyl alkyl phosphates which may be used in practicing the process of the present invention may range from about 0.5 milligram to 250 milligrams per kilogram of body weight. The insecticide is more toxic to some animals than others. Fortunately, however, the amount of the insecticidal phosphate which is effective in destroying the desired types and kinds of insects is so small compared with the $LD_{50}$ dose that the insecticide can be safely used when administered in accordance with the teachings of this invention. As will be shown hereinafter, amounts of some of the carbamoyl alkyl phosphates as low as 2.5 milligrams per kilogram of body weight, and possibly less, are highly effective against some stages of *Hypoderma lineatum* in cattle. Even smaller amounts, for instance as little as 0.5 milligram per kilogram of body weight, are effective when the dosage is continued from day to day as may be desirable in some circumstances. Tests have shown that amounts as high as 60 milligrams per kilogram of body weight will not kill cattle, although at dosage levels of 80 milligrams per kilogram of body weight, some cattle are killed with the same particular carbamoyl alkyl phosphate. Other carbamoyl alkyl phosphates are less toxic and may be administered safely in larger amounts. These, however, may not have as effective insecticidal properties; and the recommended dosage level may in such cases be higher.

An important advantage of the invention lies in the fact that the drug is rapidly metabolized in the body of the animal so that the flesh thereof is safe to eat by humans within a reasonably short period after the animal has been treated with the insecticide.

A still further advantage of the invention lies in the fact that one single dosage of the carbamoyl alkyl phosphate will kill all three stages of the warble fly which exist in the body of the animal. Thus, one or two courses of treatments per year are all that are required for the control of this insect pest. One treatment may also be sufficient to rid the animal of lice and other arthropods which may live thereon. Although one dosage will kill such transient insects as mosquitoes which attack the animal within a few hours after treatment, it is obvious that repeated dosages would be required to control mosquitoes over a long period of time. This type of mosquito control may be desired in particular circumstances but is not recommended over long periods of time.

As indicated above, the systemic insecticides of the present invention may be administered orally or parenterally. When given orally, they may be in any convenient and customary oral form of medication, such as a capsule, tablet or as a drench. The insecticide may be incorporated in the animals' feed or drinking water. If desired, the insecticide may be introduced into the body of the animal by hypodermic or intra muscular injection. In special circumstances where the compounds are absorbed through the skin, dips or sprays may be used. The manner of administration of the insecticide is not particularly important so long as the prescribed amounts of the insecticide are introduced into the body of the animal where it may be distributed throughout the body by the action of the circulatory system.

To illustrate the invention in greater particularity, a number of specific embodiments of preferred procedures will be given. It will be understood that the invention is not restricted to the use of the particular compounds used to illustrate the invention, the particular methods of administration cited, or the particular species of animal or insect so treated.

EXAMPLE I

A herd of cattle known to be infected with Hypoderma sp. in the first stage of development was selected and randomly divided into groups as will be shown in the table below. These cattle were examined closely until a few live grubs were observed under the skin of their backs, thus indicating a natural infection. One group of cattle was treated by drenching with single individual doses of O,O-dimethyl - S - (N - methylcarbamoyl)-methyl phosphorodithioate administered at the rate of 16 milligrams per kilogram of body weight in an aqueous suspension containing 0.2 percent by weight of agar and approximately 3.5 percent by weight of said dithioate. Another group of cattle were dosed in the same manner with the same drug at the rate of 44 milligrams per kilogram of body weight. The total number of live grubs in each group of cattle was observed. The cattle were again examined at the end of two weeks and at the end of four weeks. The results are shown in the following table.

*Table I*

SYSTEMIC ACTIVITY AGAINST GRUBS (HYPODERMA sp.) PROPHYLACTIC TRIALS

| Number cattle | Treatment single oral dose | Number of live grubs in the back | | | | | |
|---|---|---|---|---|---|---|---|
| | | Pretreatment | | Post-treatment | | | |
| | | | | 2 weeks | | 4 weeks | |
| | | Total | Mean | Total | Mean | Total | Mean |
| 20 | None | 5 | <1 | 78 | 4 | 132 | 7 |
| 20 | 16 mg./kg | 4 | <1 | 6 | <1 | 3 | <1 |
| 14 | 44 mg./kg | 4 | <1 | 4 | <1 | 0 | 0 |

<=Less than.

As will be seen, a total of 132 live grubs were found in the untreated cattle whereas at the end of four weeks only three live grubs were found in the group of twenty cattle treated with 16 milligrams of insecticide per kilogram of body weight. In the group of fourteen cattle receiving the higher dose, no live grubs were observed. This treatment was, therefore, effective in destroying the first-stage Hypoderma sp. grubs and was also effective in destroying those second-stage grubs which were present at the time of the treatment.

EXAMPLE II

In another series of treatments, cattle infected with Hypoderma sp. grubs in the second and third stages of development were selected. Amounts of O,O-dimethyl-S-(N-methylcarbamoyl)-methyl phosphorodithioate ranging from 2.5 to 10 milligrams per kilogram of body weight were administered orally as a drench as in Example I. Six days after treatment, the animals were sacrificed and carefully examined for dead and live grubs. The results are shown in the following table.

Table II
SYSTEMIC ACTIVITY AGAINST GRUBS (HYPODERMA sp.) IN THE BACKS OF CATTLE

| Cow No. | Single oral dose mg./kg. | Number dead grubs/total number found 6 days after treatment | |
|---|---|---|---|
| | | 2d stage | 3d stage |
| 34 | 10 | 37/37 | 56/56 |
| 49 | 10 | 5/5 | 28/28 |
| 45 | 10 | 3/3 | 7/10 |
| 39 | 10 | 9/9 | 21/24 |
| 47 | 10 | 10/10 | 23/29 |
| Total | | 64/64 | 135/147 |
| Percentage | | 100 | 92 |
| 36 | 5 | 36/36 | 18/18 |
| 42 | 5 | 5/5 | 2/17 |
| Total | | 41/41 | 20/35 |
| Percentage | | 100 | 67 |
| 30 | 2.5 | 25/29 | 2/36 |
| 35 | 2.5 | 52/55 | |
| Total | | 77/84 | 10/57 |
| Percentage | | 92 | 18 |

As will be noted from the above, as little as 5 milligrams per kilogram of body weight of O,O-dimethyl-S-(N-methylcarbamoyl)-methyl phosphorodithioate was 100 percent effective against the second-stage *Hypoderma lineatum* grubs; and as little as 2.5 milligrams per kilogram of body weight was 92 percent effective. These results also show that O,O-dimethyl-S-(N-methylcarbamoyl)-methyl phosphorodithioate was very effective against third-stage grubs.

Intramuscular administration was also effective since in two cattle receiving 10 milligrams per kilogram of body weight all four second-stage and 29 out of 33 third-stage grubs were killed by six days after treatment.

EXAMPLE III

In still another series of experiments, calves were treated with other compounds and later they were carefully examined for grubs. The following results were obtained:

Table III
SYSTEMIC ACTIVITY AGAINST CATTLE GRUBS

| Compound | | X | Weight calf kilograms | Single oral dose mg./kg. | Percent dead grubs (number grubs found 1-3 weeks after treatment) | | | Species of grubs found |
|---|---|---|---|---|---|---|---|---|
| R | R' | | | | First stage | Second stage | Third stage | |
| —CH₃ | —C₂H₅ | —CH₂— | 100 | 5+10 | ---------- | 100 (20) | 50 (18) | *H. bovis.* |
| —CH₃ | —C₂H₅ | —CH₂— | 164 | 10 | ---------- | 100 (11) | 75 (8) | *H. bovis.* |
| —CH₃ | —C₂H₅ | —CH₂— | 163 | 10 | 100 (28) | ---------- | ---------- | *H. lineatum.* |
| —CH₃ | —C₃H₇ | —CH₂— | 91 | 10 | ---------- | 100 (11) | ---------- | *H. bovis.* |
| —CH₃ | —CH₃ | —CH₂— CH₃ | 173 | 10 | ---------- | 100 (4) | 65 (43) | *H. bovis.* |

EXAMPLE IV

The effectiveness of the carbamoyl alkyl phosphates of the present invention as systemic insecticides in warm-blooded animals was demonstrated in a number of different animals at different dosage levels using mosquitoes as the test arthropod. *Aedes aegypti* mosquitoes were raised in an insectary by conventional methods and the females were selected. They were placed in appropriate containers which were held against the shaved skin of mice in such a manner that the mosquitoes were free to feed upon the mouse. The mice were fed a variety of compounds of the class set forth hereinabove at various dosage levels. Observations were made on the mosquitoes for 72 hours after being allowed to feed upon the treated mice. The dosage of the insecticide in milligrams per kilogram of body weight in the mouse necessary to kill half of the mosquitoes feeding upon the mice was determined and is set forth in the table below under the column $ED_{50}$. Also, the dosage of the insecticide in the mice which resulted in death of half of the mice was observed and is indicated in the table below.

Table IV
Basic Formula $$\begin{array}{c} RO \\ \phantom{RO}\diagdown \\ \phantom{RO}\phantom{x}P-SXCONR' \\ \phantom{RO}\diagup \phantom{xx} \| \phantom{xxxx} R' \\ RO \phantom{xxxx} S \end{array}$$

| R | Compound (R')R' | X | $ED_{50}$ | Mouse mg./kg. | |
|---|---|---|---|---|---|
| | | | | $LD_{50}$ | $\frac{LD_{50}}{ED_{50}}$ |
| —CH₃ | —(H)H | —CH₂— | 135 | >250 | >2 |
| —CH₃ | —(H)CH₃ | —CH₂— | 5 | 95 | 19 |
| —CH₃ | —(H)C₂H₅ | —CH₂— | 44 | 350 | 8 |
| —CH₃ | —(H)CH(CH₃)₂ | —CH₂— | 21 | 200 | 10 |
| —CH₃ | —(H)C(CH₃)₃ | —CH₂— | 30 | 1,050 | 35 |
| —CH₃ | —(H)CH₃ | —CH— CH₃ | 6 | 200 | 33 |
| —CH₃ | —(H)CH₃ | —CH— C₂H₅ | 20 | >250 | >12 |
| —CH₃ | —(H)CH₃ | —CH₂CH₂— | 35 | >500 | >14 |
| —CH₃ | —(CH₃)₂ | —CH₂— | 1.6 | 25 | 16 |
| —C₂H₅— | —(H)H | —CH₂— | >10 | 10 | <1 |
| —C₂H₅— | —(H)CH₃ | —CH₂— | >50 | <20 | ---- |
| —C₃H₇— | —(H)CH₃ | —CH₂— | >50 | <50 | ---- |

> = Greater than.   < = Less than.

As will be seen, the effective systemic insecticides shown in the first group above killed half of the mosquitoes at dosages ranging from 1.6 milligrams per kilogram of body weight in the case of the compound O,O-dimethyl-S-(N-dimethylcarbamoyl)-methyl phosphorodithioate to 135 milligrams per kilogram in the case of O,O-dimethyl-S-carbamoylmethyl phosphorodithioate. The amounts of insecticide necessary to kill half of the mice range from over two up to about thirty-five times the $ED_{50}$ dosages.

For purposes of comparison, the table also shows results that were obtained using closely related compounds; that is, those in which the R group was ethyl or propyl. As will be seen, these compounds are inactive or have $LD_{50}$ values greater than the $ED_{50}$ value, and of course, cannot be used as systemic insecticides in warm-blooded animals. This is most surprising in view of the fact that some of these latter types of compounds are more effective as contact insecticides than the preferred compounds of the present invention.

EXAMPLE V

The effectiveness of O,O-dimethyl-S-(N-methyl-carbamoyl)-methyl phosphorodithioate as a systemic insecticide in lambs and calves using as a test arthropod mosquitoes (*Aedes aegypti*) was determined in an experiment in which this compound was administered to lambs and calves by the oral route at dosage levels of 10 and 25 milligrams per kilogram of body weight. The female mosquitoes were allowed to feed on shaved areas of the animals' body as in Example IV at periods of one hour, four hours and twenty-four hours after oral administration of the drug. The results of this series of tests are shown in the following table.

*Table V*

| Host | Oral dose mg./kg. | Percent deaths in 72 hrs. (number Aedes fed at different periods after dosage) | | |
|---|---|---|---|---|
| | | 1 hr. | 4 hrs. | 24 hrs. |
| Lamb | 10 | 83 (23) | 70 (17) | 9 (22) |
| Do | 25 | 76 (24) | 71 (21) | 4 (25) |
| Calf | 10 | 32 (25) | 85 (28) | 4 (27) |
| Do | 25 | 96 (23) | 100 (25) | 5 (22) |

NOTE.—Mortality of mosquitoes fed on untreated controls less than 10 percent.

Another series of experiments was conducted in the same manner using other compounds at several dosage levels. These results are shown in the following table:

*Table VI*

SYSTEMIC ACTIVITY AGAINST *AEDES AEGYPTI* FED ON TREATED CALVES

| Compound | | X | Percent mortality in 72 hours (number *Aedes aegypti* feeding 1 hour after mg./kg.) | | | |
|---|---|---|---|---|---|---|
| R | (R')R' | | 2 | 5 | 10 | 20 |
| —$CH_3$ | (—$CH_3$)$_2$ | —$CH_2$— | 67 (9) | | | |
| —$CH_3$ | (H)—$C_2H_5$ | —$CH_2$— | | 0 (28) | 17 (24) | 90 (59) |
| —$CH_3$ | (H)—$CH_3$ | —CH—$\mid$ $CH_3$ | | 22 (27) | 75 (8) | |

These results show that the insecticide becomes effective within a very short period of time. However, at the end of twenty-four hours, the insecticide has lost substantially all of its effectiveness, as is indicated by the relatively small number of mosquitoes which dies after feeding upon the animal twenty-four hours after dosage.

EXAMPLE VI

The effectiveness of O,O-dimethyl-S-(N-methyl-carbamoyl)-methyl phosphorodithioate against lice (Polyplax sp.) on mice was demonstrated in the following manner.

A number of mice were given a single oral dose of the insecticide at dosage levels of 12.5 milligrams per kilogram of body weight. At the end of twenty-four hours, the total number of lice both dead and alive on each mouse and on the floor of its cage was determined. Results of this study are shown in the following table.

*Table VII*

| Single oral dose mg./kg. | Mouse No. | Totals | | | |
|---|---|---|---|---|---|
| | | Number lice removed | Number lice on host recovered | Percent lice removed | Dead lice percent of total |
| 12.5 | 1 | 405 | 288 | 64 | 62 |
| 12.5 | 2 | 160 | 18 | 89 | 85 |
| 12.5 | 3 | 135 | 50 | 73 | 73 |
| 12.5 | 4 | 256 | 234 | 52 | 50 |
| 12.5 | 5 | 413 | 2,070 | 13 | 17 |
| None | 1 | 10 | 76 | 11 | 17 |
| None | 2 | 13 | 119 | 9 | 14 |
| None | 3 | 17 | 278 | 6 | 8 |
| None | 4 | 11 | 155 | 7 | 8 |

These results show that the compound tested is effective in removing and killing lice on naturally infected mice, the percent of lice being removed from the host and the percent of the total killed lice being substantially higher in the case of the treated mice than in the case of the controls.

EXAMPLE VII

Rats and guinea pigs were treated with varying amounts of O,O-dimethyl-S-(N-methylcarbamoyl)-methyl phosphorodithioate and the effectiveness of the treatment in killing mosquitoes which were allowed to feed upon the test animals was observed. One route of administration of the insecticide was by oral administration with the phosphate being suspended in a 0.2 percent solution of agar. In another series, the drug was administrated by subcutaneous injection of a suspension thereof in sesame oil at a concentration of about 1 percent, the injection being regulated to yield the amounts of insecticide in milligrams per killogram of body weight of the guinea pig, as is shown in the table below. The mosquitoes were allowed to feed on shaved areas of the animal as in the previous work described in other examples above; and after a period of 72 hours, the number of dead mosquitoes was observed and the percentage of deaths calculated.

*Table VIII*

| Host | Route and menstruum | Percent deaths in 72 hours (number Aedes fed 1 hour after dosage—mg./kg.) | | | | | | | |
|---|---|---|---|---|---|---|---|---|---|
| | | 1.5 | 3.13 | 6.25 | 12.5 | 25 | 50 | 100 | 200 |
| G. pig | Oral-agar | | | 5(37) | 87(23) | 94(39) | 95(20) | 90(20) | 94(32) |
| Do | S.C.-oil | | | 8(49) | 92(53) | 94(58) | | | |
| Rat | Oral-agar | 0(18) | 60(39) | 90(30) | 95(20) | | | | |

NOTE.—Mortality of mosquitoes fed on untreated controls less than 10 percent.

It will be observed that O,O-dimethyl-S-(N-methylcarbamoyl)-methyl phosphorodithioate was effective when administered both orally and subcutaneously in killing mosquitoes at concentrations as low as 3.13 milligrams per kilogram of body weight.

The preferred compound for use in practicing the present invention, O,O-dimethyl-S-(N-methylcarbamoyl)-methyl phosphorodithioate, may be prepared by the process of United States Patent No. 2,494,283, issued January 10, 1950, by substituting in Example 7 a quantity of alphachloro-N-methyl acetamide equivalent to the amount of chloroacetamide used in that example. The resulting product is a colorless, crystalline solid having a melting point of 50–52° C. Similarly, O,O-dimethyl-S-(N-methylcarbamoyl)-ethyl phosphorodithioate may be prepared by replacing the chloroacetamide of Example 7 with an equivalent amount of alpha-chloro-N-ethyl-acetamide. The product is also a colorless, crystalline solid having a melting point of 66–68° C.

This application is in part a continuation of our co-pending application Serial No. 653,522 filed April 18, 1957, now abandoned.

We claim:

1. A method of controlling insects and other arthropods which comprises the step of introducing into the body of a warm-blooded animal on which said insects feed an amount of from about 0.5 milligram to 250 milligrams per kilogram of body weight of said animal a compound having the general formula:

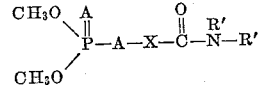

in which A is a member of the group consisting of oxygen and sulfur, X is an alkylidene radical of one to four carbon atoms and R' is a radical of the group consisting of hydrogen and lower alkyl radicals.

2. A method in accordance with claim 1 in which the systemic insecticide in introduced into the body of the animal by the oral route.

3. A method in accordance with claim 1 in which the systemic insecticide is introduced into the body of the animal by subcutaneous injection.

4. A method in accordance wtih claim 1 in which the systemic insecticide is introduced into the body of the animal by intramuscular injection.

5. A method of controlling insects and other arthropods which comprises the step of introducing into the body of a warm-blooded animal on which said insects feed an amount of from about 0.5 milligram to 100 milligrams per kilogram of body weight of said animal O,O-dimethyl-S-(N-methylcarbamoyl)-methyl phosphorodithioate.

6. A method of controlling insects and other arthropods which comprises the step of introducing into the body of a warm-blooded animal on which said insects feed an amount of from about 0.5 milligram to 100 milligrams per kilogram of body weight of said animal O,O-dimethyl-S-(N-ethylcarbamoyl)-methyl phosphorodithioate.

7. A method of controlling insects and other arthropods which comprises the step of introducing into the body of a warm-blooded animal on which said insects feed an amount of from about 0.5 milligram to 100 milligrams per kilogram of body weight of said animal O,O-dimethyl-S-(N-dimethylcarbamoyl)-methyl phosphorodithioate.

8. A method of controlling insects and other arthropods which comprises the step of introducing into the body of a warm-blooded animal on which said insects feed an amount of from about 0.5 milligram to 100 milligrams per kilogram of body weight of said animal O,O-dimethyl-S-1-(methylcarbamoyl)-ethyl phosphorodithioate.

9. A method of controlling insects and other arthropods which comprises the step of introducing into the body of a warm-blooded animal on which said insects feed an amount of from about 0.5 milligram to 100 milligrams per kilogram of body weight of said animal O,O-dimethyl-S-1-(methylcarbamoyl)-propyl phosphorodithioate.

10. A method of controlling insects and other arthropods which comprises the step of introducing into the body of a warm-blooded animal on which said insects feed an amount of from about 0.5 milligram to 100 milligrams per kilogram of body weight of said animal O,O-dimethyl-S-2-(ethylcarbamoyl)-ethyl phosphorodithioate.

11. A method of controlling insects and other arthropods which comprises the step of introducing into the body of a warm-blooded animal on which said insects feed an amount of from about 0.5 milligram to 200 milligrams per kilogram of body weight of said animal O,O-dimethyl-S-(N-isopropylcarbamoyl)-methyl phosphorodithioate.

12. A method of controlling insects and other arthropods which comprises the step of introducing into the body of a warm-blooded animal on which said insects feed an amount of from about 0.5 milligram to 200 milligrams per kilogram of body weight of said animal O,O-dimethyl-S-(t-butylcarbamoyl)-methyl phosphorodithioate.

References Cited in the file of this patent

UNITED STATES PATENTS

| | | |
|---|---|---|
| 2,494,283 | Cassaday | Jan. 10, 1950 |
| 2,811,480 | Norris | Oct. 29, 1957 |

OTHER REFERENCES

McGregor: J. of Econ. Entomology, vol. 47, No. 3, June 1954, pp. 465–467.